G. W. JONES.
Working Scrap Iron.

No. 99,574.                                        Patented Feb. 8, 1870.

Witnesses:
Chas. C. Wilson
H. W. Mygatt

Inventor:
George W. Jones.
by Bakewell & Christy
his Attys.

UNITED STATES PATENT OFFICE.

GEORGE W. JONES, OF ORMSBY, PENNSYLVANIA.

Letters Patent No. 99,574, dated February 8, 1870.

IMPROVEMENT IN WORKING OF SCRAP AND OTHER IRON.

The Schedule referred to in these Letters Patent and making part of the same.

*To all whom it may concern:*

Be it known that I, GEORGE W. JONES, of Ormsby, in the county of Allegheny, and State of Pennsylvania, have invented a new and useful Improvement in Working Iron; and I do hereby declare the following to be a full, clear, and exact description thereof, reference being had to the accompanying drawing, making a part of this specification, in which—

Figure 1:
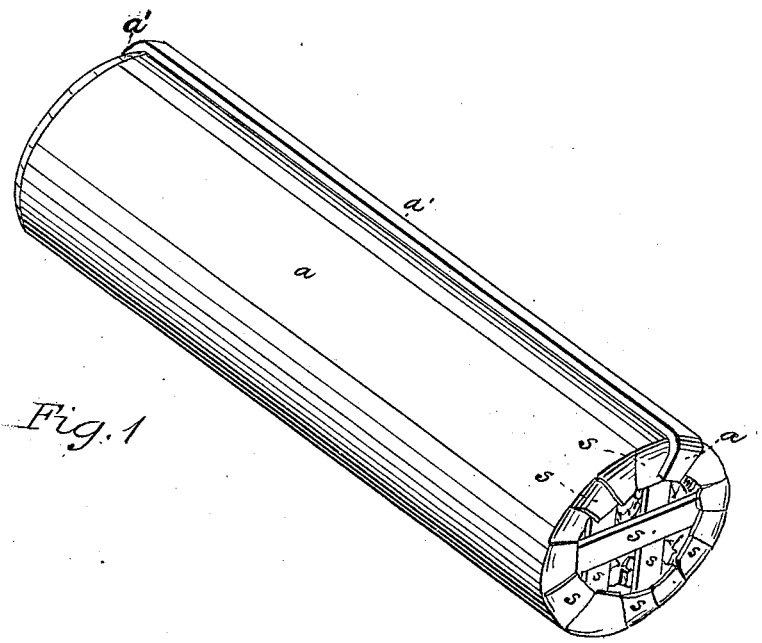
Figure 3:
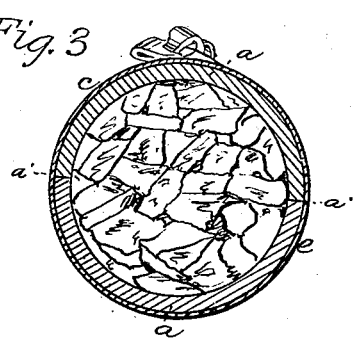
Figure 2:
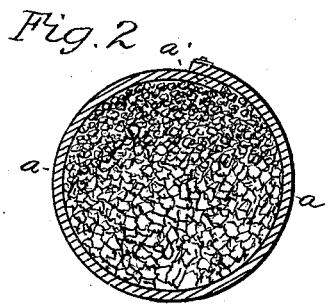

Figure 1 is a perspective view of my improved mode of putting up iron and steel, preparatory to the reworking of it, and Figures 2 and 3 illustrate, by cross-sections, the mode of using my improvement in the working of iron and steel in various forms.

Like letters of reference indicate like parts in each.

My invention relates to an improvement in the working of iron, which is so far converted as to be capable of being worked under heat and by compression.

I apply it to the reworking of what is generally called scrap-iron, such as borings, filings, chips or shavings produced in turning, punchings of nuts, and pieces of wrought-iron of all kinds, sizes, and shapes; also to the reworking of puddled iron, for the purpose of improving its quality, and likewise to the working of what is known as pig-bloom and pig-scrap, and also granulated iron, in whatever way such granulation be effected.

My improvement enables me to save time, labor, and fuel in balling, and the expense of an entire heat in rolling or hammering, and I am also enabled to produce a more perfectly-finished article.

To enable others skilled in the art to make use of my improvement, I will proceed to describe the same in some of its various applications.

I first make, in any of the ways known to the art, an iron skelp, of any desired width, length, and thickness, but, preferably, such that when folded, by rolling or by the use of skelping-dies, it shall give a casing, $a$, of cylindrical form, or approximating to such form, and large enough to contain sufficient iron to produce, with itself, a bar of iron of the desired size. The edges $a'$ of such casing may form either a stub or lap-joint, at pleasure.

This casing I fill with granulated iron, or pig-bloom, or pig-scrap, or with what is commonly known as scrap-iron, or with puddled iron broken or cut up for further working, or with any kind of iron which is either partially converted, or which is wholly converted, or which, by the application of heat, can be brought to a condition such that it can be worked by percussion or pressure.

If the filling consist of pig-bloom, pig-scrap, granulated iron, or small or minutely subdivided pieces of scrap-iron, the ends of the casing $a$ should be closed by an iron plug or cross-bar, $s'$, or by turning down the ends $s$, or in any other suitable way, so as to keep the contents in place; but with larger pieces of iron, the filling may be packed or wedged in sufficiently tight to keep them from coming out while being heated.

The casing $a$, with its contents, is then placed in any suitable heating-furnace raised to the temperature usually employed in the working of such iron, and then taken out and worked, by percussion or compression, directly into bar or other desired form of iron, without requiring reheating.

In the reworking of the different kinds of iron hereinbefore specified, the practice has been to charge the materials loosely into the furnace, heat them at least to the point of agglutination, and then ball them up, as it is called.

This mode is attended with considerable loss, since, during the process of heating, the iron is more or less wasted by oxidation. With scrap-iron also, two heats are required, since, at a single heat, the ragged projecting ends of the pieces of scrap cannot be so worked down and welded together as to give a good finish to the bar, before they become chilled and set.

In my improvement the casing $a$, which, if so desired, can be made of the best quality of iron, is rolled down, so as to form the surface of the bar of a smooth and good style of finish; and such casing also retains the heat of its contents so long, that they can be perfectly welded and compacted into a solid, well-made bar, at the one heat. I also save the labor of balling, which, of itself, is no inconsiderable item, especially in the working of pig-bloom, pig-scrap, and granulated iron.

The casing $a$, instead of being made of a single sheet or skelp, may be made of two or more pieces, fastened together by a band or bands, &c., as illustrated in fig. 3; it only being necessary in this respect that two opposite sides of the casing be made without joint.

The casing $a$, with its contents, (scrap-iron, as in figs. 1 and 3, or granulated iron, as in fig. 2, or iron or steel in any of the forms indicated above,) being raised to the desired temperature, is placed under the hammer, or passed between rolls in such way, that with the first action thereon, all the joints of the casing $a$ will be welded up; and then the hammering and rolling can be carried on with such rapidity that the casing and its filling can be rolled out into a complete, well-finished bar, at the one heat. The iron of the casing, it will be observed, forms the face of the bar.

In the manufacture of some qualities of iron, it is customary to flatten down the puddle-ball by the hammer, break it up when cold, assort the pieces according to the quality indicated by the fracture, and then reheat, reball, and rework it. My improvement is well adapted to the reworking of such iron, with the advantages already indicated.

I apply the same process to the reworking of such qualities of steel as are capable of being worked or brought to a working condition, by heat and percussion, or compression, and also to converting iron into steel, where heat only, of less than a melting-temperature, is required to complete such conversion.

What I claim as my invention, and desire to secure by Letters Patent, is—

In the process specified, raising to a working-temperature the iron or steel, while it is enclosed in a casing as described, and welding or closing up all joints in the casing at the first action of the rolls or hammer thereon, so as to produce a finished bar at a single heat, substantially as above set forth.

In testimony whereof, I, the said GEORGE W. JONES, have hereunto set my hand.

G. W. JONES.

Witnesses:
H. F. MANN,
F. M. ROBERTS.